US 8,117,053 B2

(12) United States Patent
Bajaj

(10) Patent No.: US 8,117,053 B2
(45) Date of Patent: Feb. 14, 2012

(54) CLAIMS BASED FACTORY PATTERN FOR CREATING OBJECTS

(75) Inventor: Aseem Bajaj, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 339 days.

(21) Appl. No.: 12/408,554

(22) Filed: Mar. 20, 2009

(65) Prior Publication Data
US 2010/0241485 A1   Sep. 23, 2010

(51) Int. Cl.
*G06Q 10/00* (2012.01)
(52) U.S. Cl. .......................... 705/7.11; 705/1
(58) Field of Classification Search ............ 705/1, 7.11, 705/26.64
See application file for complete search history.

(56) References Cited

U.S. PATENT DOCUMENTS

| 2004/0133659 A1* | 7/2004 | Lacey et al. ............... 709/219 |
| 2007/0100967 A1* | 5/2007 | Smith et al. ............... 709/219 |
| 2008/0301125 A1* | 12/2008 | Alves et al. ................. 707/5 |
| 2009/0300586 A1* | 12/2009 | Bernardini et al. ......... 717/126 |

* cited by examiner

*Primary Examiner* — Thomas L. Mansfield, Jr.
(74) *Attorney, Agent, or Firm* — Fliesler Meyer LLP

(57) ABSTRACT

A claims-based factory pattern is described for creating objects on an application server. The pattern extends the functionality of factories to include the operations of staking a claim to creating particular objects and re-evaluating their claim in light of other factories staking claims. A process to create an object includes checking all registered factories to see whether they are willing to stake a claim. The claims are then compared to select a factory having the highest claim. If two or more factories have the same claim, they are asked to re-evaluate the claim by providing them information regarding other factories that have also staked a claim. Once the factories have re-evaluated their claims, their number can be reduced to a single factory that will be used to create the object. Alternatively, if no factory can be singled out, the caller can be informed of the deadlock.

20 Claims, 3 Drawing Sheets

CLAIMS BASED FACTORY PATTERN FOR CREATING OBJECTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application servers, factories and other object creation tools.

BACKGROUND

Application servers provide a comprehensive platform for developing, deploying, and integrating enterprise applications. They supply the presentation, business and information access logic, security and management services, as well as the underlying infrastructure needed for a wide variety of software applications. Typically, an application server supports many types of clients, such as web browsers and wireless devices, as well as different operating systems, databases, message queues and legacy systems.

In recent years, a standard has emerged for modularizing the deployment of various software components, including application servers. This standard has been proposed by the OSGi alliance (formerly known as the Open Services Gateway Initiative) and it involves the process of breaking up and packaging the server into multiple bundles, which can be deployed onto different physical machines, upgraded, started and stopped remotely, and the like. Application servers usually include a number of components that can be broken up in this manner, including different factories used for creating objects (e.g. instantiating classes, etc.).

A factory can be thought of as an object used to create other objects in a consistent manner. The factory pattern thus solves the problem of disassociating the user from the creational details of objects. It is generally undesirable to allow each developer to create objects ad hoc, due to the possible lack of consistency among them. As a solution, instead of manually creating each object, the application can invoke a factory that will carry out the steps needed to create the object.

However, the standard software factory pattern does not address the relationships between multiple factories. This becomes significant when more than one factory can be used to carry out the same job and a factory needs to be chosen before using it to create objects. Some factories are more specialized forms of other factories and thus frequently multiple factories can be used to create the same object. This can be thought of as a problem of overlapping factories since there is an overlap in the set of situations that they can handle. In order to ensure consistency in functionality, it is important to ensure that factories are selected in a uniform and consistent way.

In the past, one way to select factories has been by using the order of factory registration. Factories are usually registered with the application server in a particular order during server startup. Thus, when two or more factories are capable of creating a requested object, the factory that was registered first with the application server would be selected to carry out the creation. However, as a result of OSGi and server modularization, the order of factory registration may not necessarily be consistent across different server startups. Because OSGi bundles can be deployed in different orders or combinations, it is no longer desirable to use factory registration to set priority for selecting the factory used to create a particular object. For example, if factory registration order were to be used, different factories could end up responsible for creating a particular object depending on the order in which the server bundles were started up. This can lead to inconsistencies in functionality and other issues. As such, an alternative process for selecting factories is desirable, one which enables consistent functionality among objects regardless of order of startup or registration. Applicants have identified the foregoing as well as other needs that currently exist in the art in coming to conceive the subject matter of the present disclosure.

SUMMARY OF THE INVENTION

A claims-based factory pattern is described for creating objects on an application server. This new pattern extends the functionality of factories to include the operations of staking a claim to creating particular objects or object types and re-evaluating their claim in light of other factories staking claims. Thus, instead of simply invoking the create operation during object creation, a new process is employed that includes checking all registered factories to see whether they are willing to stake a claim. The claims are then compared and a factory having the highest claim is selected to carry out the object creation. If two or more factories have the same claim, they are asked to re-evaluate the decision to stake the claim by providing them a list of other factories that have also staked a claim to create the object. Once the factories have re-evaluated their claims, their number can be reduced to a single factory and this single factory can be used to create the object. Alternatively, if no factory can be singled out, the caller can be informed of the deadlock.

The new claims-based factory helps to create consistency in the selection of factories, regardless of the order in which they were registered. As a result, it enables the modularization of the application server and the ability to deliver standalone containers. Additionally, the new pattern allows multiple versions of the same factory to co-exist and to mitigate object creation precedence amongst each other.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with the embodiments of the invention, systems and methods are described for providing a claims-based factory pattern for object creation on an application server. In order to enable this new pattern, the factories of an application server are enabled with the following operations:

1. Stake a claim to object creation;
2. Re-evaluate the claim in light of other factories staking claims; and
3. Create object.

In various embodiments, a three step process is followed to create objects instead of the usual single step of invoking the create operation. In one embodiment, the process includes checking all registered factories to see if they are willing to stake a claim. If more than one factories stake claim, factory with the highest value claim is selected to create the object. If more than one factory has the highest value claim, the process can give them a chance to withdraw claim by asking the factories to re-evaluate by providing them a list of other factories that have staked claim. In the case where the list of factories reduces to a single factory, it can be used to create the requested object. Otherwise, the caller of the create method can be informed of the claim deadlock.

In various embodiments, the process for selecting factories can be implemented in a separate managing entity, such as a general purpose tool that owns the factory registration infrastructure. The process removes the restriction of strict ordering of factory registration at the cost of extra complexity in defining claims. It also enables complete modularity of the application server, while maintaining the consistency in factory selection.

Throughout this disclosure, the term "factory" is used to cover any component that is used to create an instance of an object on an application server. The term "object" means any segment of code, such as a class, data structure, function or routine, that can be instantiated by a software application.

Figure 1:
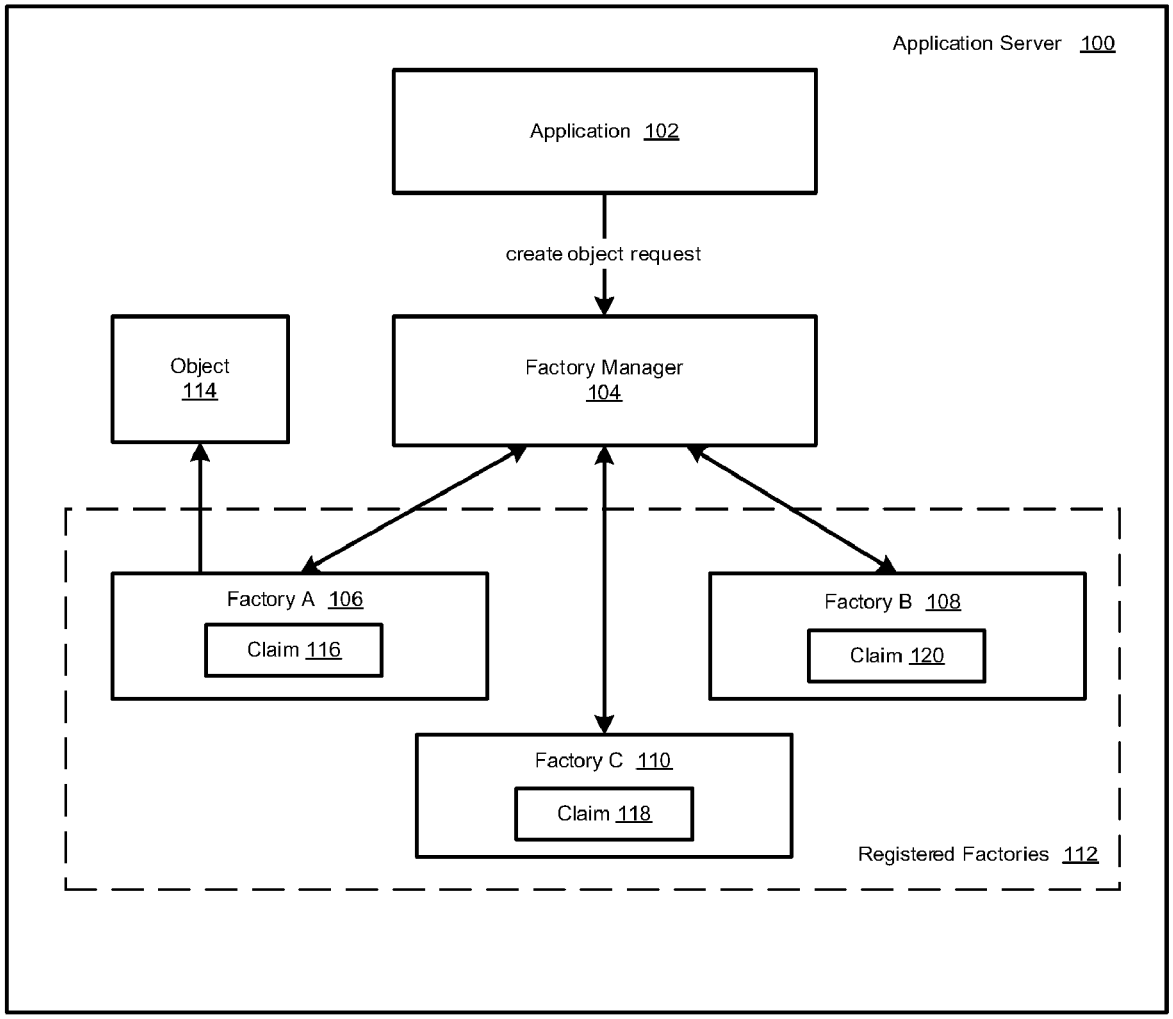
FIG. 1 is a system level diagram of the claims-based factory pattern, in accordance with various embodiments of the invention.

FIG. 1 is a system level diagram of the claims-based factory pattern, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, an application server 100 can contain a number of registered factories 112 used to create objects. The process for selecting between the factories can be implemented in a separate managing entity, such as a factory manager 104. In one embodiment, the factory manager is a general purpose tool that owns the factory registration infrastructure.

The factory manager 104 receives a request to create an object from the application 102. It should be noted that the term "application," as used throughout this disclosure includes more than typical user-based software applications on the application server, but can also include various internal server components, as well as any other entities that can request an object to be created.

Once the request is received, the manager determines which of the registered factories 106, 108, 110 are staking a claim to creating this type of object. These claims can then be compared to see which factory has the highest claim.

In various embodiments, the claims 116, 118, 120 can be implemented as any object that can be compared and/or evaluated against another object. For example, in one embodiment, the claim is implemented as a Boolean, where the value of "true" is considered greater than the value of "false." In another embodiment, the claim is implemented as a data structure having a number of fields, where the fields can be compared between two instances of the data structure to determine which claim is higher. It should be noted that the invention described herein is not limited to any particular implementation of the claim.

Once the manager receives the claims from the registered factories, it can determine which of the factories is staking a highest claim. If two or more factories are staking the same claim, the manager can provide this information to the competing factories in order to give them an opportunity to withdraw the claim in light of knowing which other factories have also staked a claim. For example, if one factory is an older version of the same factory staking a claim, it may choose to withdraw its claim to create the object.

Once one factory is selected, it can be employed to create the requested object 114. If no single factory can be chosen, the information regarding the factory deadlock can be provided to the caller.

Figure 2:
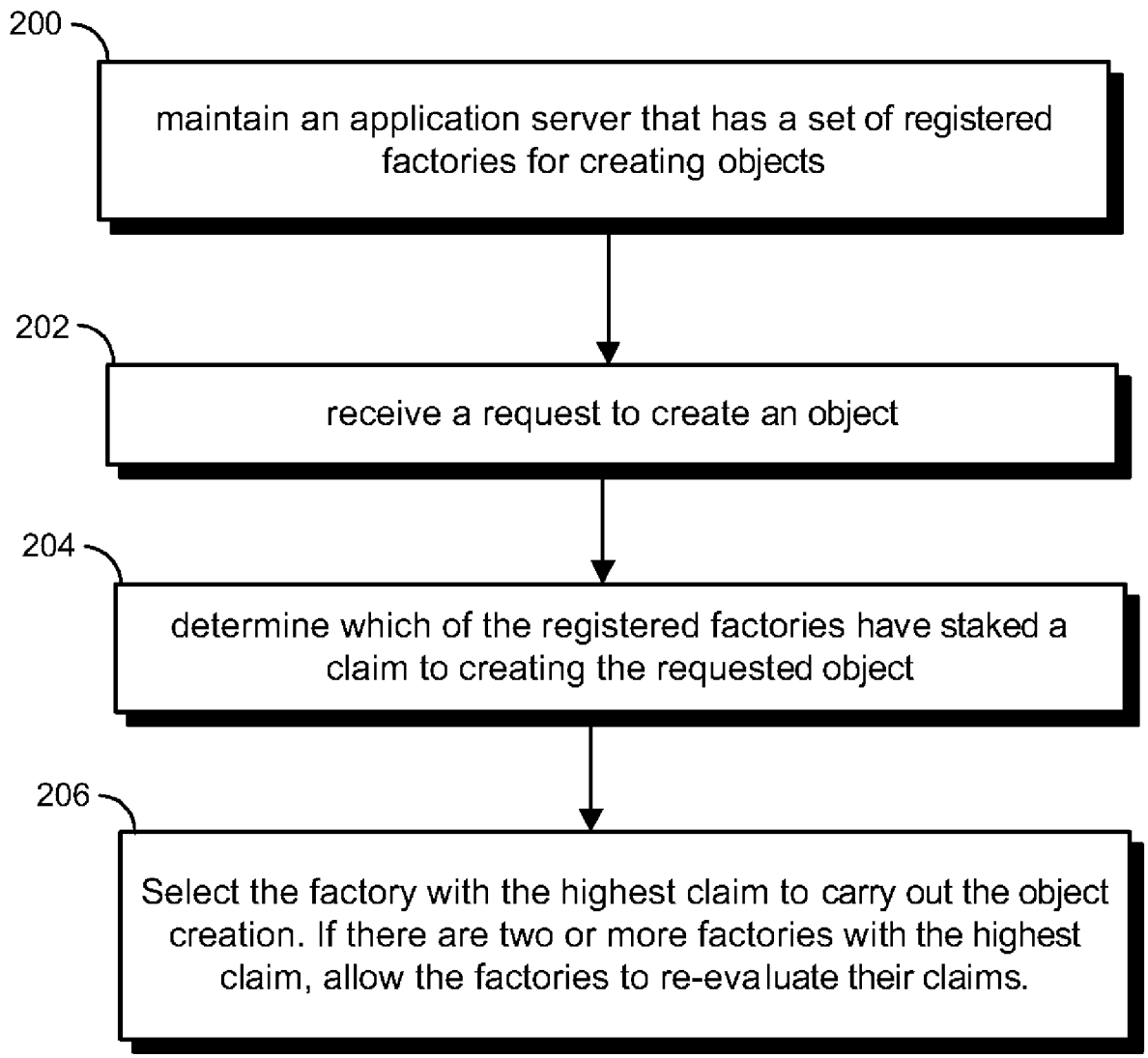
FIG. 2 is a flow chart diagram of the high level process for providing a claims-based factory pattern, in accordance with various embodiments of the invention.

FIG. 2 is a flow chart diagram of the high level process for providing a claims-based factory pattern, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 200, an application server typically includes a set of registered factories used to create objects. In step 202, a request to create an object is received. In step 204, it is determined which of the registered factories have staked a claim to create the requested object. If one factory has the highest claim to creating the object, that factory will be used. Otherwise, the factories are allowed to re-evaluate their claims by providing information regarding all of the claims to the competing factories.

Figure 3:
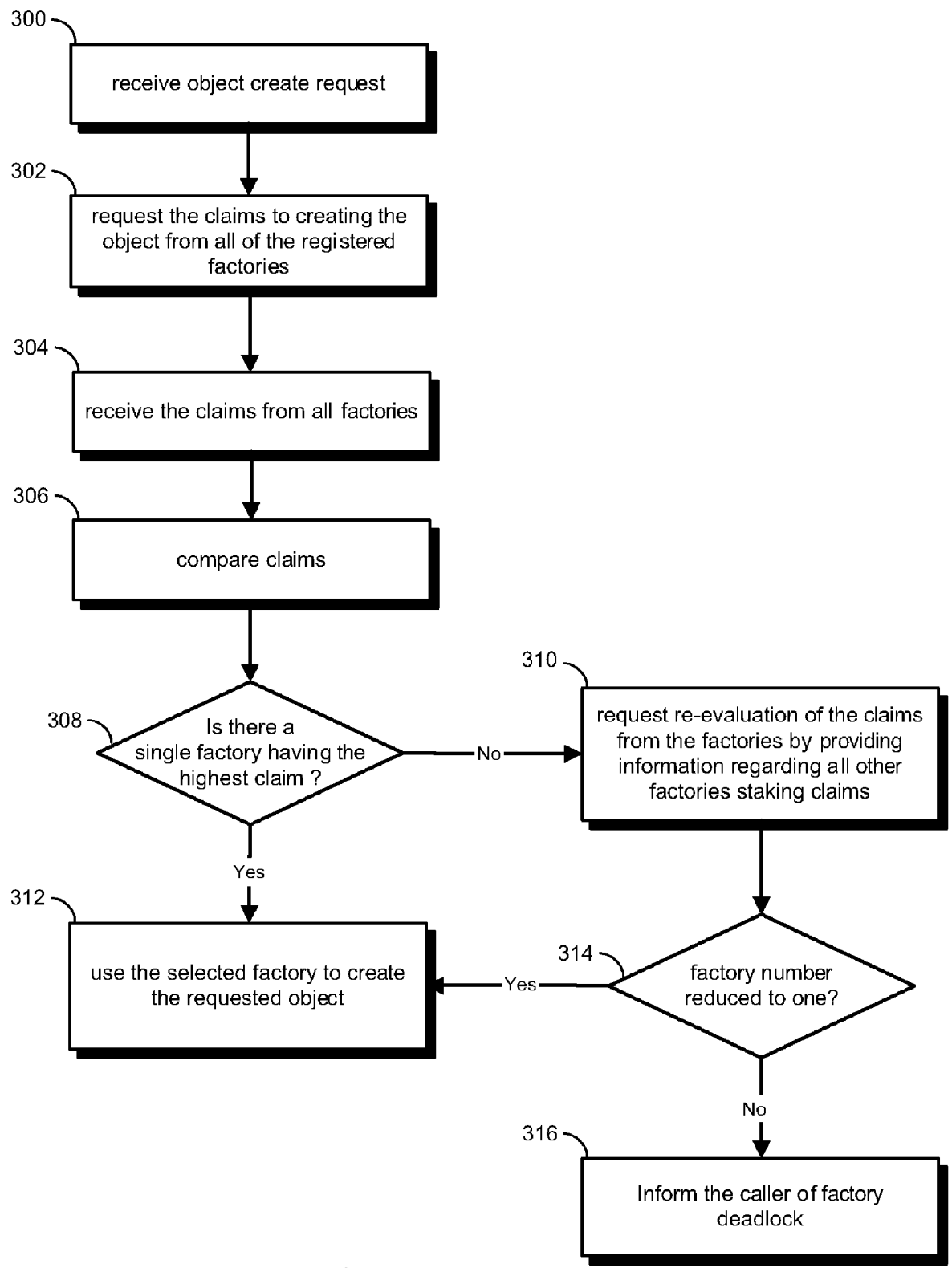
FIG. 3 is another flow chart diagram of the claims-based factory pattern, in accordance with various embodiments of the invention.

FIG. 3 is another flow chart diagram of the claims-based factory pattern, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In step 300, a request to create an object is received. In one embodiment, this request is received to the factory selection management tool. In step 302, the management tool requests claims from all of the registered factories. Once all of the claims have been received (step 304), they are compared, as shown in step 306. If there is a single factory having the highest claim (step 308), it can be used to create the object, as shown in step 312. If there is more than one factory staking the highest claim, the management tool can request re-evaluation of the claims from the factories, as shown in step 310. This can be done by providing information regarding the other factories to each factory with the highest claim. This offers an opportunity for the factories to withdraw their claim in light of knowing which other factories have staked competing claims.

If the number of competing factories can be reduced to one (step 314), that single factory can be used to create the object. If there still exist two or more competing factories, the caller can be informed of the deadlock, as shown in step 316.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing a claims-based factory pattern for creating objects in an application server, said method comprising:

maintaining an application server, executing on a computer including a non-transitory computer readable storage medium and processor, having a plurality of factories deployed thereon, each of said plurality of factories capable of creating objects, wherein the objects are stored in the non-transitory computer readable storage medium;

receiving a request to create an object;

determining which of the plurality of factories stake claims to creating the requested object; and evaluating the claims and selecting at least one factory staking the highest claim to creating said requested object, wherein if two or more of the plurality of factories are staking the highest claim, requesting the two or more of the plurality of factories to re-evaluate the claim by providing information to each of the two or more of the plurality of factories regarding all other factories staking the same claim to creating said object;

reducing the two or more of the plurality of factories to a single factory as a result of re-evaluating the claim; and creating said requested object by using the single factory.

2. The method of claim 1, wherein the step of selecting at least one factory staking the highest claim for creating said requested object is performed independently of any factory registration order.

3. The method of claim 1, wherein maintaining the application server having a plurality of registered factories further includes extending each of the plurality of factories to perform the following operations:

stake a claim to creating a particular object; and re-evaluate the claim in light of information regarding other factories staking said claim.

4. The method of claim 1, wherein the application server is separated into two or more deployment bundles, such that the plurality of factories is distributed amongst two or more deployment bundles.

5. The method of claim 1, wherein the claims are implemented as a Boolean.

6. The method of claim 1, wherein the claims are implemented as a data structure containing a plurality of fields.

7. The method of claim 1, further comprising:

if no single factory can be selected, informing a request caller that a factory deadlock exists.

8. A system for providing a claims-based factory pattern for creating objects in an application server, said system comprising:

a computer including a non-transitory computer readable storage medium and processor;

an application server, executing on the computer, having at least one application deployed thereon;

a plurality of factories that create objects on the application server; and a factory manager that receives a request to create an object from the at least one application, wherein the factory manager uses the processor to determine which of the plurality of factories is staking a claim to create the requested object, evaluate the claims, select at least one factory staking the highest claim in order to create the requested object, wherein if two or more of the plurality of factories are staking the highest claim, requesting the two or more of the plurality of factories to re-evaluate the claim by providing information to each of the two or more of the plurality of factories regarding all other factories staking the same claim to creating said object;

reduce the two or more of the plurality of factories to a single factory as a result of re-evaluating the claim; and create said requested object by using the single factory.

9. The system of claim 8, wherein selecting at least one factory staking the highest claim for creating said requested object is performed independently of any factory registration order.

10. The system of claim 8, wherein each of the factories on the application server are extended to perform the following operations:

stake a claim to creating a particular object; and re-evaluate the claim in light of information regarding other factories staking said claim.

11. The system of claim 8, wherein the application server is separated into two or more deployment bundles, such that the plurality of factories is are distributed amongst two or more deployment bundles.

12. The system of claim 8, wherein the claims are implemented as a Boolean.

13. The system of claim 8, wherein the claims are implemented as a data structure containing a plurality of fields.

14. The system of claim 8, wherein a request caller is informed of a factory deadlock if no single factory can be selected to create the object.

15. A non-transitory computer-readable storage medium carrying one or more sequences of instructions for providing a claims-based factory pattern for object creation on an application server, which instructions, when executed by one or more processors, cause the one or more processors to carry out the steps of:

maintaining an application server having a plurality of factories deployed thereon, each of said plurality of factories capable of creating objects;

receiving a request to create an object;

determining which of the plurality of factories stake claims to creating the requested object; and evaluating the claims and selecting at least one factory staking the highest claim to creating said requested object, wherein if two or more of the plurality of factories are staking the highest claim, requesting the two or more of the plurality of factories to re-evaluate the claim by providing information to each of the two or more of the plurality of factories regarding all other factories staking the same claim to creating said object;

reducing the two or more of the plurality of factories to a single factory as a result of re-evaluating the claim; and creating said requested object by using the single factory.

16. The non-transitory computer-readable storage medium of claim 15, wherein the step of selecting at least one factory staking the highest claim for creating said requested object is performed independently of any factory registration order.

17. The non-transitory computer-readable storage medium of claim 15, wherein maintaining the application server having a plurality of registered factories further includes extending each of the plurality of factories to perform the following operations:

stake a claim to creating a particular object; and re-evaluate the claim in light of information regarding other factories staking said claim.

18. The non-transitory computer-readable storage medium of claim 15, wherein the application server is separated into two or more deployment bundles, such that the plurality of factories is distributed amongst two or more deployment bundles.

19. The non-transitory computer-readable storage medium of claim 15, wherein the claims are implemented as a Boolean.

20. The non-transitory computer-readable storage medium of claim 15, wherein the claims are implemented as a data structure containing a plurality of fields.

* * * * *

UNITED STATES PATENT AND TRADEMARK OFFICE
CERTIFICATE OF CORRECTION

PATENT NO. : 8,117,053 B2  
APPLICATION NO. : 12/408554  
DATED : February 14, 2012  
INVENTOR(S) : Bajaj Page 1 of 1

It is certified that error appears in the above-identified patent and that said Letters Patent is hereby corrected as shown below:

In column 7, line 17, in Claim 11, after "is" delete "are".

Signed and Sealed this  
First Day of May, 2012

David J. Kappos  
*Director of the United States Patent and Trademark Office*